United States Patent [19]
Romberger et al.

[11] 3,714,014
[45] Jan. 30, 1973

[54] ELECTROCHEMICAL APPARATUS FOR DETERMINATION OF MOLTEN SALT COMPOSITION

[75] Inventors: Karl A. Romberger, Weatherly, Pa.; Jerry Braunstein, Oak Ridge, Tenn.

[73] Assignee: The United States of America as represented by the United States Atomic Energy Commission

[22] Filed: Feb. 10, 1971

[21] Appl. No.: 114,314

[52] U.S. Cl. ............................. 204/195 R, 204/1 T
[51] Int. Cl. .......................................... G01n 27/46
[58] Field of Search ....... 136/86 A, 86 R; 204/195 R, 204/243 R, 243 M, 244–247

[56] References Cited

UNITED STATES PATENTS

| | | | |
|---|---|---|---|
| 1,196,699 | 8/1916 | Keyes et al. | 204/243 R |
| 2,905,613 | 9/1959 | Tomonari et al. | 204/243 R |
| 2,921,110 | 1/1960 | Crowler et al. | 136/86 A |
| 3,219,486 | 11/1965 | Salcedo Gumucio | 136/86 A |
| 3,293,159 | 12/1966 | Mekjean et al. | 204/243 R |
| 3,404,036 | 10/1968 | Kummer et al. | 136/86 A |
| 3,480,520 | 11/1969 | Smith | 204/195 R |
| 3,523,066 | 8/1970 | Morris et al. | 204/195 R |
| 3,565,769 | 2/1971 | Holden et al. | 204/195 R |

*Primary Examiner*—T. Tung
*Attorney*—Roland A. Anderson

[57] ABSTRACT

An electrochemical cell and method have been provided which permit continuous monitoring and precise adjustment of the composition of a fuel salt solvent for molten salt nuclear reactors without using electrodes or solutions of extraneous materials as a variable to monitor composition changes. A concentration cell with transference is established which consists of identical half-cells separated by an ion transfer barrier, one having a fixed composition and the other having a composition which is unknown. The emf of the concentration cell, which is a function of the composition change in the half-cell containing the unknown composition, is measured and the molten salt composition determined from a calibration plot.

5 Claims, 2 Drawing Figures

INVENTORS.
Karl A. Romberger
BY   Jerry Braunstein

ATTORNEY.

ELECTROCHEMICAL APPARATUS FOR DETERMINATION OF MOLTEN SALT COMPOSITION

BACKGROUND OF THE INVENTION

The present invention was made during the course of, or under, a contract with the United States Atomic Energy Commission.

This invention relates generally to methods and apparatus for electrochemical analysis of solutions and more particularly to a method and apparatus for determining and/or controlling the composition of a molten metallic salt solution.

In molten salt nuclear reactors, composition of the fuel salt solvent (i.e., $LiF-BeF_2$) must be adjusted within narrow limits in order to achieve a desirable balance among nuclear properties of the constituents, melting temperatures of the mixtures and cost of the materials.

It is a considerable advantage during the preparation of the salt mixture in terms of elapsed time, over-all cost and quality control of the resulting product if a continuous, immediately responsive and reliable method is available to monitor salt composition as the mixtures are being prepared. Molten salt reactors of the future will require large inventories of several different molten salt mixtures. Therefore, it will be seen that there is considerable need for a means by which immediate, reliable monitoring of a molten salt mixture can be made, not only during preparation but for continuous, on-line monitoring without removing salt samples from the system as was the case with previous methods. This invention provides means for filling that need.

SUMMARY OF THE INVENTION

In view of the above need, it is therefore an object of this invention to provide an immediately responsive and reliable method of determining the composition of molten salts in situ.

It is another object of this invention to provide such a method that is simple, easily performed, and utilizes an easily measurable electrical quantity.

Yet another object of this invention is to provide the above method based on the use of electromotive force (emf) of a concentration cell which does not require electrodes or solution of extraneous materials as the variable to monitor composition changes.

Further, another object of this invention is to provide apparatus for performing the method of the foregoing objects.

Other objects will appear from the following description.

Briefly, the development is based on the use of the electromotive force (emf) of a concentration cell which does not require electrodes or solutions of extraneous materials as the variable to monitor composition changes. When isothermal conditions are maintained and the composition of one of the two-half-cells is fixed, as by the presence of a saturating phase, the cell emf will be solely a function of the composition change in the second of the two half-cells. The cell emf can then be immediately related to the composition of the salt in the second half-cell by means of the appropriate calibration curves.

The emf cell devised for the present purpose is a so-called "concentration cell with transference" employing identical compatible metal electrodes, such as beryllium, each of which is immersed into one of two molten salt solutions, such as $LiF-BeF_2$, one having a known composition and the other an unknown composition to be determined, which are separated by a porous barrier. The cell name is derived from the fact that the electrodes are identical and the driving force is provided by a concentration gradient between the half-cells, and upon the passage through the cell, electrical neutrality can only be maintained by the passage of ions across the porous barrier. In order to improve reliability, the cell may have redundant electrodes so that any unexpected emf changes, as from one of the electrodes being poisoned, would be immediately noted.

DETAILED DESCRIPTION

Figure 1:
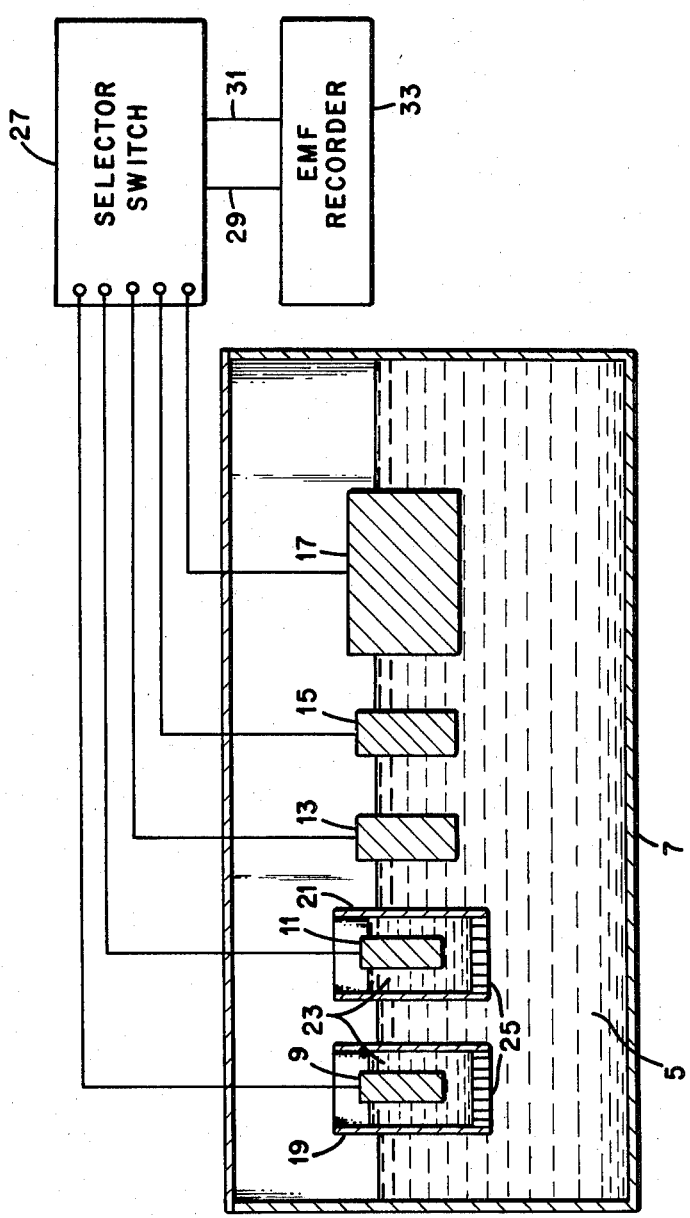
FIG. 1 is a schematic cross sectional view of a preferred embodiment of a concentration cell with transference for determining the composition of a molten salt solution according to the present invention.

Referring now to FIG. 1, the concentration cell will be described with reference to monitoring the composition of a molten salt solution comprising a lithium fluoride and beryllium fluoride ($LiF-BeF_2$) binary mixture. It will be obvious to those skilled in the art that other molten metallic salt solutions may be monitored by using the appropriate compatible metal electrodes. The molten salt solution 5 is contained by a molybdenum or nickel container 7 which may be an integral part of a molten salt reactor system in which the solution is contained in an inert atmosphere. The cell may contain a number of beryllium metal electrodes of which five are shown here for purposes of illustrating the invention. Four of the electrodes, 9, 11, 13 and 15, should be small compared to a fifth electrode 17 which acts as a scavenger for any impurities which might be reactive with beryllium metal and would, therefore, be removed by means of reduction with the beryllium metal. A pair of redundant electrodes formed by anode electrodes 9 and 11 which act independently but are otherwise identical reference half-cells saturated with LiF by selection of an appropriate $LiF-BeF_2$ mixture composition for the desired operating temperature with the aid of the known phase diagram of the system so that salt flow into or out of electrically isolating cell compartments 19 and 21, which surround electrodes 9 and 11, respectively, does not alter the electrode composition and hence potential. Each of the isolating compartments is made of a metal such as nickel or molybdenum which is compatible with the molten salt solution 5 being prepared or monitored. Electrical contact between the salt solution 23 within the compartments 19, 21 and the salt solution 5 is provided through a fritted nickel bottom portion forming a melt transfer barrier. The porosity of the fritted nickel 25 is small enough, i.e., $\approx 10$ to 40 microns average pore diameter, to minimize salt flow therethrough but large enough to allow sufficient electrolytic conduction.

Electrodes 13 and 15 which are the cathode electrodes may be alternately inserted into the salt melt 5 so that any change in the measured emf may be noted, indicating that one of the cathode electrodes has been poisoned by reducible materials which have not been reduced by the scavenger electrode 17. For example, if electrode 13 has been in operation for some time as the cathode electrode, electrode 15 may be inserted and a measure of the emf between electrodes 13 and 15 would indicate whether or not electrode 13 has been poisoned.

Each of the electrodes 9 through 17 is connected respectively to the terminals of a conventional selector switch 27 whereby the voltage difference between any two pairs of electrodes may be conveniently selected and applied respectively to output leads 29 and 31 which may be connected to any convenient emf recording means, such as a conventional strip chart recorder 33 shown in block form.

When preparing molten salt solutions in a vessel 7 under static conditions a conventional mechanical stirrer (not shown) may be inserted in the solution to maintain the homogeneity of the melt. In a large production facility, or when monitoring an on-line reactor system, a multiplicity of pairs of beryllium electrodes, as described above, may be conveniently located at various points throughout the system in contact with the molten salt to provide a continuous determination of the homogeneity of the salt being prepared or used. In addition to providing a continuous monitoring capability, the emf of the cell in this method yields an absolute value for the composition of the salt with an accuracy several times better than the accuracy of $\pm 0.01$ mole fraction available from the previously used batch analysis method. For example, the emf of the concentration cell with transference

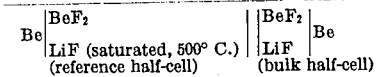

is shown as a function of $BeF_2$ composition of the bulk half-cell using a LiF saturated reference half-cell solution at 500°C. The cell emf would be zero when both solutions are saturated with LiF ($X_{BeF_2} = 0.312$). Therefore, this curve serves as a calibration curve for a reference composition at a temperature of 500°C. This curve was obtained by assembling a cell such as shown in FIG. 1 on a laboratory scale and monitoring the emf during additions of LiF and/or $BeF_2$ at a fixed temperature.

Figure 2:
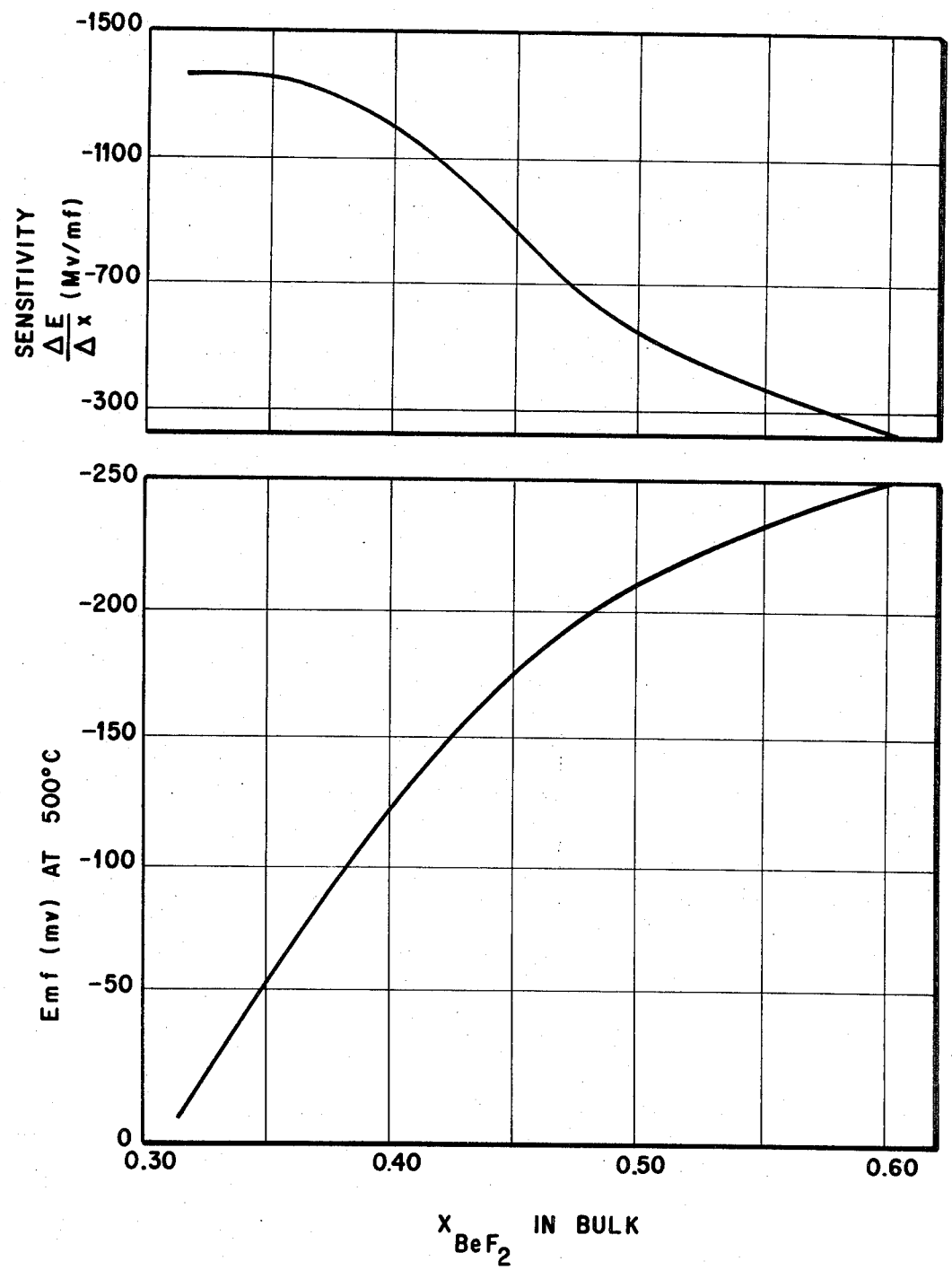
FIG. 2 is a calibration curve for a $LiF-BeF_2$ system at 500°C wherein the emf is plotted as a function of $BeF_2$ composition and a cell sensitivity curve plotted as a function of $BeF_2$.

The sensitivity of the determination varies with composition as shown by the plot $\Delta E/\Delta X$ vs. $X(BeF_2$ in bulk) at the top of FIG. 2. As shown, the sensitivity remains essentially constant between the LiF liquidus and $X = 0.4$ concentration levels, after which it continuously decreases as the $BeF_2$ concentration increases. The present concentration cell with transference has been found to be stable to $\pm 0.01$ millivolt (mv).

For compositions between 0.312 and 0.43 mole fraction $BeF_2$, an error of 1 millivolt in the cell potential is equal to a composition error of less than 0.001 in mole fraction. The major source of emf error for absolute composition determination is with temperature uncertainties within the cell. The potentials generated by the beryllium electrode half-cells in the bulk salt have essentially no temperature coefficient; however, the LiF saturated reference compartment has a large temperature coefficient. For temperatures near 500°C, $dE/dt = 0.528$ mv/°C and $dx/dt = 0.004$ mf/°C so that a temperature uncertainty of $\pm 2.5$°C yields a composition uncertainty of $\pm 0.001$ mole fraction (mf).

Laboratory data to date employing metal cells indicate that the cell emf's are much more reliable than one millivolt so that the expected composition's error is definitely less than 0.001 mole fraction $BeF_2$. This temperature source of error may be minimized to negligible values by placing a reference electrode, a calibrated thermocouple and an indicator in close proximity to one another via a self contained probe.

Accordingly, it will be seen that an electrochemical method and apparatus have been provided which are of considerable advantage over the prior art methods of obtaining molten salt composition measurements. Some specific advantages obtained through use of the described invention are as follows:

By providing an all metal cell, no extraneous materials are included which can contaminate the salt (as distinct from pH or other glass or membrane electrode systems) since all cell materials are those which would normally be in contact with the fuel salt (Be, Ni, Mo, LiF, $BeF_2$). Therefore, leakage can introduce no contamination into the salt. Although the metal construction makes breakage of the electrode assembly unlikely, even in the event of breakage, no contamination would result.

The described method is unique since it makes available continuous, on-line monitoring of molten salt composition whereas previous methods relied on inventory monitoring and periodic batch analysis. In the subject method no salt sample need be removed from the system.

No independent reference electrode is needed, as distinct from existing galvanic cell measuring devices such as pH meters, since the cell is a concentration cell with two identical electrodes. The presence of a solid salt phase in the reference compartment is not absolutely necessary. However, it does provide a buffer so that moderate leakage into the reference compartment can be tolerated without potential change. Beryllium rod electrodes, immersed in melts of the same composition, in all metal cells invariably show emf differences of less than 0.3 millivolts. Usually, the emf differences are no more than 0.05 millivolts.

The excellent reproducibility and long-term stability of the all metal cells indicate that they should remain compatible for long periods (months) with the extremely corrosive molten fluoride salt.

The disclosed cell could be modified to apply to other salt mixtures with suitable electrodes. Examples would include $LiF$-$ThF_4$ binary mixtures using thorium electrode assemblies to replace the beryllium electrodes described in this disclosure. The electrode is the metallic form of one of the ionic constituents of the mixtures which is electrochemically reversible to this ionic constituent but non-reactive to the other constituents of the mixture.

While there has been shown and described and pointed out the fundamental novel features of the invention as applied to a preferred embodiment thereof, it will be understood that various other embodiments and changes may be made by those skilled in the art without departing from the spirit and scope of the following claims.

What is claimed is:

1. A device for measuring the composition of a binary molten metallic salt solution for molten salt nuclear reactors by means of electromotive force generated in a concentration cell, comprising:
a first metal electrode for displacement in contact with said binary molten salt solution so as to form one half-cell of said cell;
a reference half-cell including a metal container for partial displacement in said binary molten salt solution, said container having a bottom fritted portion for contact with said binary molten salt whose composition is to be measured so as to form a melt transfer barrier, a molten binary metal salt reference solution diposed in said containercontaining at least one of said binary salts in the solid phase so as to maintain a known constant liquid composition in said reference half-cell, and a second metal electrode disposed in said reference binary molten salt solution, said second electrode being of identical material as that of said first electrode; and
means connected between said first and second electrodes for measuring the generated emf of said cell as an indication of the composition of said binary molten salt solution being measured.

2. The device according to claim 1 wherein said metal electrodes are composed of one of the metals of said binary salt reference solution.

3. The device according to claim 2 further including an additional scavenging electrode for displacement in contact with said molten salt solution whose composition is to be measured, said scavenging electrode having a substantially larger surface area than said first electrode for removing reducible impurities from said molten salt solution.

4. The device according to claim 3 wherein said binary salt reference solution is a $LiF-BeF_2$ mixture, each of said electrodes is composed of beryllium and said metal reference half-cell container is composed of nickel.

5. The device according to claim 4 wherein said at least one salt contained in solid phase is LiF and further including means for maintaining the temperature of said reference molten salt solution constant at about 500°C.

* * * * *